United States Patent
Hayakawa (12)

(10) Patent No.: US 10,253,709 B2
(45) Date of Patent: Apr. 9, 2019

(54) REGENERATION METHOD FOR EXHAUST-GAS AFTERTREATMENT DEVICE IN ENGINE-DRIVEN COMPRESSOR, AND ENGINE-DRIVEN COMPRESSOR PROVIDED WITH SAID AFTERTREATMENT DEVICE

(71) Applicant: HOKUETSU INDUSTRIES CO., LTD, Niigata (JP)

(72) Inventor: Tasuku Hayakawa, Niigata (JP)

(73) Assignee: HOKUETSU INDUSTRIES CO., LTD., Niigata (JP)

( * ) Notice: Subject to any disclaimer, the term of this patent is extended or adjusted under 35 U.S.C. 154(b) by 209 days.

(21) Appl. No.: 15/502,626

(22) PCT Filed: Sep. 3, 2014

(86) PCT No.: PCT/JP2014/073178
§ 371 (c)(1),
(2) Date: Feb. 8, 2017

(87) PCT Pub. No.: WO2016/035164
PCT Pub. Date: Mar. 10, 2016

(65) Prior Publication Data
US 2017/0226945 A1    Aug. 10, 2017

(51) Int. Cl.
*F01N 3/025*      (2006.01)
*F01N 3/10*       (2006.01)
(Continued)

(52) U.S. Cl.
CPC .......... *F02D 41/029* (2013.01); *F01N 3/025* (2013.01); *F01N 3/106* (2013.01); *F02D 9/02* (2013.01);
(Continued)

(58) Field of Classification Search
CPC .......... F01N 3/025; F01N 3/106; F02D 29/04; F02D 41/029; F02D 41/1441;
(Continued)

(56) References Cited

FOREIGN PATENT DOCUMENTS

JP    2001-280118    10/2001
JP    2004-346836    12/2004
(Continued)

OTHER PUBLICATIONS

Corresponding Chinese Office action, Chinese Appl No. 201480081709.7, dated Aug. 13, 2018.
(Continued)

*Primary Examiner* — Mark A Laurenzi
(74) *Attorney, Agent, or Firm* — Cooper Legal Group, LLC; Ronald M. Kachmarik

(57) ABSTRACT

Provided is a forced-regeneration treatment method for an exhaust-gas aftertreatment device (DPF) and an associated engine-driven compressor. When the amount of particulate matter (PM) deposited in a filter element of a DPF reaches a predetermined amount and a forced-regeneration start command is input, a capacity controlling means of the engine-driven compressor is disabled to close an intake valve and to open the discharge side of a compressor main unit to atmosphere, thereby causing the compressor main unit to achieve a low-load state. The operation mode of the engine is switched to a predetermined forced-regeneration mode to operate the engine at a predetermined speed and to increase the temperature of the gas. The temperature inside the DPF is increased to reach a temperature at which an oxidative catalyst is activated and to a temperature lower than the self-combustion temperature of the PM, thereby forcibly burning the PM.

20 Claims, 5 Drawing Sheets

(51) Int. Cl.
*F02D 41/02* (2006.01)
*F02D 9/02* (2006.01)
*F02D 41/14* (2006.01)
*F02D 41/40* (2006.01)
*F04B 35/00* (2006.01)
*F04B 49/06* (2006.01)
*F04B 49/22* (2006.01)
*F02D 29/04* (2006.01)

(52) U.S. Cl.
CPC ......... *F02D 29/04* (2013.01); *F02D 41/1441* (2013.01); *F02D 41/1446* (2013.01); *F02D 41/1448* (2013.01); *F02D 41/405* (2013.01); *F04B 35/002* (2013.01); *F04B 49/065* (2013.01); *F04B 49/225* (2013.01); *F02D 2009/023* (2013.01); *F02D 2200/0812* (2013.01); *F04B 2203/0605* (2013.01); *Y02T 10/44* (2013.01)

(58) Field of Classification Search
CPC ............. F02D 41/1446; F02D 41/1448; F02D 41/405; F02D 9/02; F02D 2009/023; F02D 2200/0812; F04B 35/002; F04B 49/065; F04B 49/225; F04B 2203/0605; Y02T 10/44
See application file for complete search history.

(56) References Cited

FOREIGN PATENT DOCUMENTS

| | | |
|---|---|---|
| JP | 2005-120917 | 5/2005 |
| JP | 2005-241219 | 9/2005 |
| JP | 2010-261340 | 11/2010 |
| JP | 2011-112004 | 6/2011 |
| JP | 2012-097681 | 5/2012 |
| JP | 5312272 | 7/2013 |

OTHER PUBLICATIONS

Corresponding International Application PCT/JP2014/073178, International Search Report dated Nov. 25, 2014, 4 pages.

REGENERATION METHOD FOR EXHAUST-GAS AFTERTREATMENT DEVICE IN ENGINE-DRIVEN COMPRESSOR, AND ENGINE-DRIVEN COMPRESSOR PROVIDED WITH SAID AFTERTREATMENT DEVICE

TECHNICAL FIELD

The present invention relates to an engine-driven compressor equipped with an aftertreatment apparatus for exhaust gas, and more specifically relates to a method for regenerating a filter element provided in the aftertreatment apparatus for exhaust gas by burning and removing Particulate Matter (hereinafter referred to as "PM") absorbed by, deposited or collected on and/or in (these are hereinafter collectively called "deposited on") the filter element, and to an engine-driven compressor equipped with configuration to implement the regeneration method.

BACKGROUND OF THE INVENTION

An engine-driven compressor having a compressor body driven by an engine enables compressed air to be obtained even in situations in which it is difficult to secure power supply. In particular, package-type engine-driven compressors, in which a compressor body, an engine, and other required equipments have been integrated together and accommodated in a soundproofed box, are widely employed as compressed air supply sources in civil engineering and construction field or sites and the like due to their ease of transport and installation.

Since diesel is superior to gasoline in its fuel consumption and gas mileage, a diesel engine is typically used as an engine for driving the compressor body in such engine-driven compressors for saving running costs.

However, because of their structure, diesel engines emit a larger amount of PM together with exhaust gas upon combustion as compared with gasoline engines. Since PM causes air pollution and health hazards, regulation values (mass per unit output [g/kWh]) for PM emitted from a diesel engine are determined by emission gas regulation. To adapt to this emission regulation, aftertreatment apparatuses with a diesel particulate filter (hereinafter referred to as a "DPF") are installed in exhaust gas paths of diesel engines in order to reduce the emission amount of PM.

Since the DPF collects PM in exhaust gas by the built-in filter material in order to reduce the emission amount of PM, with continuous use, the deposition of PM with respect to the filter element proceeds and eventually clogs the filter element. Increase in the resistance for the exhaust gas due to the clogging of the DPF results in lowering the engine output and deteriorating fuel efficiency. Thus, it requires a process to regenerate the filter element by removing PM deposited on the filter element.

As an exemplary method for regenerating the filter element, a continuous regeneration type DPF in which an oxidation catalyst is accommodated at an entrance side of the DPF and the filter element is accommodated at a downstream of the oxidation catalyst has been suggested. This continuous regeneration type DPF is continuously burning and removing PM by means of the heat of the exhaust gas while the engine is running, in which $NO_2$ is generated by the action of an oxidation catalyst when heated to its activation temperature or more by the exhaust gas during operation of the engine, and the $NO_2$ can be used as an oxidizer in burning of PM so as to regenerate the filter element at a temperature lower than that at which the PM burns by itself with oxygen.

However, even in the above continuous regeneration type DPE, when the engine runs for a long time with the temperature of the exhaust gas below the activation temperature of the oxidation catalyst, such as when the engine runs under a low load for a long time, $NO_2$ is not generated and the FM cannot be burned. Consequently, the deposition of PM with respect to the filter element proceeds. Once the engine transits to high-load operation after PM is deposited with respect to the filter element beyond a certain amount and the resistance for the exhaust gas is thus elevated, the elevated resistance for the exhaust gas increases the temperature of the exhaust gas to higher than that in normal high load operation. As a result, a large amount of PM deposited in the filter element starts to burn by themselves so as to emit high heat, which causes cracks or melts in the DPF body and the filter element (hereinafter referred to as the filter element or the like) accommodated in the DPF.

Therefore, even in the continuous regeneration type DPF, when the deposition amount of PM with respect to the filter element becomes or exceeds a predetermined amount, a temperature of the exhaust gas is increased by additionally injecting fuel or delaying the injection timing and thus a temperature of the oxidation catalyst in the DPF is increased, so that PM deposited on a filter element is forcibly burned with $NO_2$ as an oxidizer ((Patent Document 1).

It should be noted that, although not disclosing configuration related to a DPF, Patent Documents 2 and 3 disclose inventions related to methods for controlling running of engine-driven compressors.

The engine-driven compressors described therein perform capacity control and speed control during running to supply compressed air at a certain pressure to the consumption side with low fuel consumption (Patent Documents 2, 3).

The capacity control thereof is control to open an inlet port of a compressor body and to transition into loaded running in which intake and compression of air is performed when pressure at a discharge side of the compressor body falls to below a predetermined set pressure due to consumption of compressed air, and to close an inlet port of a compressor body and to transition into unloaded running in which intake and compression of air is stopped when pressure at the discharge side of the compressor body reaches the predetermined set pressure or greater.

Moreover, the speed control is control to raise the rotational speed of the engine as pressure at the discharge side of the compressor body falls, and to decrease the rotational speed of the engine as pressure at the discharge side of the compressor body rises.

It should be noted that in the engine-driven work machine described in the Patent Document 3, when in the above-mentioned unloaded running in which the inlet port of the compressor body is in a closed state, there is a proposal to reduce the load on the engine during the unloaded running by releasing the pressure on the discharge side of a compressor body to the atmosphere, or by introducing the pressure on the discharge side to an inlet passage of an inlet valve.

RELATED ARTS

Patent Documents

Patent Document 1: Japanese Patent LOPI No. 2001-280118
Patent Document 2: Japanese Patent LOPI No. 2005-120917
Patent Document 3: Japanese Patent No. 5312272

SUMMARY OF THE INVENTION

Problem to be Solved by the Invention

Although the forced regeneration method introduced as the above-listed Patent Document 1 describes forced regeneration of a DPF installed in an automobile, DPF forced regeneration is a process not only needed for a DPF installed in an automobile, but is also needed when a DPF is installed in an engine-driven compressor.

However, the forced regeneration method introduced as Patent Document 1 relates to forced regeneration performed when the automobile is travelling, and hence in a state in which variation occurs in the load on the engine (referred to as a "variable-load type forced regeneration" in the present specification).

Namely, the above-mentioned forced regeneration is directed toward preventing damage to a filter element from heating arising due to self burning of a large amount of PM on the filter element by forcible burning with $NO_2$ as an oxidizing agent when the deposition amount of PM has exceeded a predetermined amount prior to a large amount of PM being deposited. However, even in cases in which PM of the above-mentioned predetermined amount is burned, damage to the filter element is incurred due to being subjected to instantaneous intense heat in case PM being burned in high speed.

There is accordingly a need to maintain the temperature inside the DPF during forced regeneration at a temperature of an activation temperature of an oxidation catalyst or higher, yet also at a temperature below the self burning temperature of the PM (the oxygen burning temperature).

The temperature inside the DPF changes according to the exhaust gas temperature of the engine, and the exhaust gas temperature of the engine changes according to variation in the load on the engine. Thus, a temperature raising means (mainly post injection) is also employed to increase the temperature of the oxidation catalyst in a state in which the temperature of the exhaust gas is low due to the engine running under a low load.

However, even if post injection is started in a state in which the temperature of the exhaust gas is low due to the low load running of the engine, a few minutes to about ten minutes are needed until the temperature of the oxidation catalyst is increased by the post injection to the activation temperature or higher. Moreover, continuous running is required for 20 to 30 minutes in a state in which the oxidation catalyst is at the activation temperature or higher until the PM is forcibly burned by the $NO_2$ generated by the oxidation catalyst that has reached the activation temperature or higher, and until regeneration of the filter element is completed.

In contrast thereto, in cases in which running operation is performed during low load running by repeatedly performing high load running for an extremely short period of time and then returning to low load running, the temperature of the oxidation catalyst becomes unstable and is unable to be maintained in a state of the activation temperature or higher due to increase or decrease in the fuel injection amount by post injection accompanying load variation, or due to repeated operation stopping post injection during the temporary high load running. This results in being unable to stably/continuously generate $NO_2$ and being unable to burn the PM. Alternatively, burning of PM may also be interrupted due to an operator stopping the engine even though forced regeneration is being executed. Not only is the filter element unable to be regenerated, there is sometimes an increase in the amount of PM deposited, and even though there is forced regeneration (variable-load type forced regeneration) functionality, PM is deposited on the filter element in large amounts, the exhaust gas resistance rises, and when the exhaust temperature rises abnormally and reaches the self burning temperature of the PM, the large amounts of deposited PM rapidly burned by itself, with concerns of damage to the DPF body and the filter element.

Thus an object of the present invention is to provide, as a novel method for forced regeneration of a DPF provided to an engine-driven compressor, in place of the above-mentioned "variable-load type forced regeneration", or in combination with the "variable-load type forced regeneration", a forced regeneration in which a state of a certain load on the engine is maintained, and the forced regeneration is accordingly capable of being performed in a state in which the temperature inside the DPF is stabilized (hereinafter referred to as a "fixed-load type forced regeneration"), and to provide an engine-driven compressor equipped with a structure for implementing the fixed-load type forced regeneration.

Means for Solving the Problems

Means for solving, the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the above described object, a method for regenerating an aftertreatment apparatus for exhaust gas (DPF) 50 in an engine driven compressor 1 of the present invention comprising;

a compressor body 10 that takes in and compresses a compressible fluid to be compressed, an engine 20 that drives the compressor body 10, a capacity control unit 30 that includes an inlet valve 12 for opening or closing an inlet port 11 of the compressor body 10 and that performs capacity control by opening or closing the inlet valve 12 according to changes in pressure on a discharge side of the compressor body 10, and a speed control unit 40 for performing rotational speed control of the engine 20, and the method is characterized in that:

providing the DPF 50 on an exhaust path 21 of the engine 20, the DPF 50 including a filter element for collecting Particulate Matter (PM) in exhaust gas and an oxidation catalyst;

when a deposition amount of the PM on the filter element provided in the DPF 50 reaches a predetermined amount (10 g/L as an example) or greater than the former for starting forced regeneration, and a command for the starting forced regeneration has been input, deactivating capacity control by the capacity control unit 30, closing the inlet valve 12, and opening the discharge side of the compressor body 10 to the atmosphere, so as to place the compressor body 10, that is, the compressor 1 in a low load state; and, switching the engine 20 to running in a forced regeneration mode in which the engine 20 has a predetermined regeneration rotational speed and is placed in a predetermined running state to raise the temperature of exhaust gas, so as to perform forced regeneration processing by increasing the temperature inside the DPF 50 to a temperature that is an activation temperature of the oxidation catalyst or above and is a temperature below the self burning temperature of the PM, and forcefully burning the PM deposited on the filter element of the DPF 50.

In the above method of regenerating the DPF 50, when the deposition amount of the PM on the filter element provided in the DPF 50 reaches the predetermined amount (10 g/L as an example) or greater than the one for starting forced regeneration, pre-processing may be provided to deactivate rotational speed control by the speed control unit 40, to transition the engine 20 into a stand-by running mode running at a predetermined unloaded rotational speed (1350 min$^{-1}$ as an example), and to stand-by for input of the forced regeneration start command; and when the forced regeneration start command has been input during running in the stand-by running mode, the forced regeneration processing may be performed by deactivating the capacity control, placing the compressor body 10 in the low load state, and switching the running state of the engine 20 from the stand-by running mode to the forced regeneration mode.

The forced regeneration processing may be performed continuously until a predetermined time (30 minutes as an example) has elapsed and the deposition amount of the PM on the filter element is less than a predetermined end amount of forced regeneration (8 g/L as an example).

The running control for the running state of the engine 20 in the forced regeneration mode may be accompanied by additional injection of fuel.

As used herein, the term "additional injection of fuel" encompasses any kinds of additional fuel injection which is performed after a main fuel injection and is effective in increasing a temperature of exhaust gas. Furthermore, the term encompasses a subsequent-injection, a post-injection, and an after-injection (JIS D 0116-5: 2008) for which a time interval without any injection is definitely set after a main injection, as well as any other fuel injection performed successively to a main injection.

Furthermore, preferably, switching of the running state of the engine 20 to the forced regeneration mode is performed after the compressor body 10 has been placed in the low load state.

More preferably, switching of the running state of the engine 20 to the forced regeneration mode is performed after pressure on the discharge side of the compressor body 10 has dropped to a predetermined lower-limit pressure or lower.

Furthermore, an engine driven compressor 1 of the present invention for performing the method for regenerating the DPE comprises a compressor body 10 that takes in and compresses a compressible fluid, an engine 20 that drives the compressor body 10, a capacity control unit 30 that includes an inlet valve 12 for opening and closing an inlet port 11 of the compressor body 10 and that performs capacity control by opening or closing the inlet valve 12 according to changes in pressure on a discharge side of the compressor body 10, and a speed control unit 40 for performing rotational speed control of the engine, and the engine driven compressor 1 is characterized by comprising:

an aftertreatment apparatus for exhaust gas (DPF) 50 that is provided on an exhaust path 21 of the engine 20 and that collects PM in exhaust gas;

an input device 64 for inputting a start command for forced regeneration processing in the DPF 50;

a forced regeneration control unit 62 that outputs a switching signal on input of the start command by the input device 64;

a low load operating apparatus 70 for placing the compressor body 10 in a low load state by receiving the switching signal from the forced regeneration control unit 62, deactivating the capacity control by the capacity control unit 30, closing the inlet valve 12, and opening the discharge side of the compressor body 10 to the atmosphere and further providing;

a forced regeneration running control unit 82 for receiving the switching signal from the forced regeneration control unit 62, and transitioning the engine 20 into running in a forced regeneration mode in which the engine 20 is run at a predetermined regeneration rotational speed and placed in a predetermined running state to raise the temperature of exhaust gas.

The above engine driven compressor 1 may further comprises:

pressure detection units (Ps1, Ps2) for detecting the pressure inside the DPF 50 before and after passing the filter element;

a deposition state determination unit 83 for receiving detection signals from the pressure detection units (Ps1, Ps2), computing a deposition amount of the PM with respect to the filter element and comparing the computed deposition amount of the PM against a pre-set reference value to determine a deposition state of the PM with respect to the filter element; and a stand-by running control unit 84 may be provided. When the deposition state determination unit 83 has determined that the PM is deposited at or more than a predetermined amount for starting forced regeneration at which forced regeneration is to be performed, the stand-by running control unit 84 deactivates the rotational speed control by the speed control unit 40, and transitions the engine 20 into a stand-by running mode of running at a predetermined unloaded running speed (1350 min$^{-1}$ as one example), and standing by for input of a start command by the input device 64.

The engine driven compressor 1 may further comprises a clogging state display 63 for indicating the filter element is in a clogged state when the deposition state determination unit 83 has determined that the PM is deposited at the amount for starting forced regeneration or greater.

The engine driven compressor 1 may further comprises:

a timer that counts an elapsed time since input of a start command by the input device 64, wherein when the timer has counted the predetermined time, and the deposition state determination unit 83 has determined that the amount of PM deposited on the filter element is less than a predetermined end amount of forced regeneration (8 g/L as one example), the forced regeneration control unit 62 ends control of the inlet valve 12 and opening of the discharge side of the compressor body 10 to the atmosphere by the low load operating apparatus 70, and activates capacity control by the capacity control unit 30; and the forced regeneration running control unit 82 ends running of the engine 20 in the forced regeneration mode and restores speed control by the speed control unit 40.

The forced regeneration running control unit 82 may perform additional injection of fuel in the forced regeneration mode.

Preferably, the forced regeneration running control unit 82 transitions the engine 20 into running in the forced regeneration mode after the compressor body 10 has been placed in the low load state by the low load operating apparatus 70.

In the above case, the engine driven compressor 1 may further comprises discharge pressure detector 24 for detecting the pressure at the discharge side of the compressor body 10 so that the forced regeneration running control unit 82 transitions the running state of the engine 20 into the forced regeneration mode when the pressure from the discharge pressure detector 24 at the discharge side of the compressor body 10 reaches a predetermined lower-limit pressure.

Effect of the Invention

Due to configuring the present invention as described above, the method for regenerating the DPF of the engine driven compressor 1 according to the present invention, and the engine driven compressor 1 executing the method, are able to obtain the following remarkable effects.

The DPF forced regeneration explained as a related art (Patent Document 1) is forced regeneration (variable-load type forced regeneration) performed while an automobile is traveling, and hence in a state in which load on an engine varies. However, the method of the present invention performs DPF forced regeneration in a state in which capacity control by the capacity control unit 30 is deactivated and load on the engine is lowered and stabilized as a predetermined low loaded state of the compressor body 10, and in a state in which the rotational speed of the engine 20 is fixed at a predetermined regeneration rotational speed (referred to as "fixed-load type forced regeneration" in the present specification). Hence the PM deposited on the filter element can be reliably burned and regenerated while avoiding damage to the filter element or the like.

In an engine-driven compressor, it is achieved to reduce a load on the compressor 1 even by merely closing the inlet port 11 of the compressor body 10 comparing in case the inlet port 11 opens.

However, in a state in which pressure at the discharge side of the compressor body 10 is maintained at a high pressure by merely closing the inlet port 11 of the compressor body 10, there is still a comparatively high load ratio of about 30% on the engine 20 due to running the compressor body 10 against the compressed air trying to flow back from the discharge side toward the inlet side.

In contrast thereto, in the configuration of the present invention in which regeneration processing is performed in a state in which the discharge side of the compressor body 10 is opened to the atmosphere, the load on the compressor body 10 can be lowered further due to dropping of the pressure on the discharge side of the compressor body 10, regeneration processing can be implemented at low fuel consumption, and the risk of damage to the filter element or the like can be decreased even more by suppressing a rise in the exhaust temperature of the engine during regeneration processing.

In the configuration provided with the pressure detection units (Ps1, Ps2) for detecting the pressure inside the DPF 50 before and after passing the filter element; the deposition state determination unit 83 for determining the deposition state of the PM with respect to the filter element based on the detection signals of the pressure detection units (Ps1, Ps2); and the stand-by running controller unit 84 for deactivating rotational speed control of the engine by a speed control unit 40 and performing stand-by running at a predetermined unloaded rotational speed when determined by the deposition state determination unit 83 that the deposition amount of PM with respect to the filter element is a predetermined amount for starting forced regeneration or greater, the engine is transitioned into high load running for the interval after the filter element has become clogged until starting forced regeneration, and the occurrence of rapid burning of the PM and damage to the filter element are prevented.

Moreover, in the configuration provided with the clogging state display 63 to indicate that the filter element is in a predetermined clogged state, the operator can be made aware of a state in which forced regeneration processing of the DPF is needed.

Due to the above-mentioned forced regeneration processing continuing for a predetermined time, and until the amount of PM deposited on the filter element is less than a predetermined end amount of forced regeneration (for example, 8 g/L), the deposited PM can be reliably burned/removed, and the filter element can be regenerated.

It is possible to increase the temperature inside the DPF to that needed for forced regeneration and to control injection of fuel to the engine by performing additional injection of fuel, and there is no need to provide separate heating unit such as a heater.

It should be noted that running of the engine 20 can be transitioned into a forced regeneration mode in a state in which load on the engine 20 has been decreased whereby performing the forced regeneration processing after opening the discharge side of the compressor body 10 to the atmosphere, and, more preferably, after the pressure at the discharge side of the compressor body 10 has dropped to a predetermined lower-limit pressure. Thus the exhaust temperature can be prevented from rising excessively due to an unexpectedly high load on the engine, and damage to the filter element or the like can be prevented.

MODE FOR CARRYING OUT THE INVENTION

Explanation follows regarding an engine-driven compressor 1 of the present invention with reference to the appended drawings.

Fixed-Load Type Forced Regeneration

A method for forced regeneration of DPF according to the present invention is performed by adopting "fixed-load type forced regeneration" that is performed in a state in which variation in load on the engine has been excluded.

In the "fixed-load type forced regeneration", in order to obtain the most appropriate exhaust gas temperature/flow rate to enable an oxidation catalyst to be maintained in a stable state at its activation temperature, the engine rotational speed during forced regeneration is set at a predetermined regeneration rotational speed, and a fuel main injection amount to maintain the regeneration rotational speed, and also a fuel injection amount by additional injection to increase the temperature of the oxidation catalyst are pre-set.

In the fixed-load type forced regeneration adopted in the present application, in contrast to the variable-load type forced regeneration described in the related art, the engine is maintained at the set regeneration rotational speed during forced regeneration, and since variation in the load on the engine is excluded, the fuel injection amount by additional injection is fixed at a certain amount. Namely, the total amount of fuel supplied by the fuel main injection and additional injection is set such that the heating amount supplied to the DPF by burning fuel results in the activation temperature of the oxidation catalyst or above, yet is such that the permissible temperature of the DPF is not exceeded.

Figure 5:
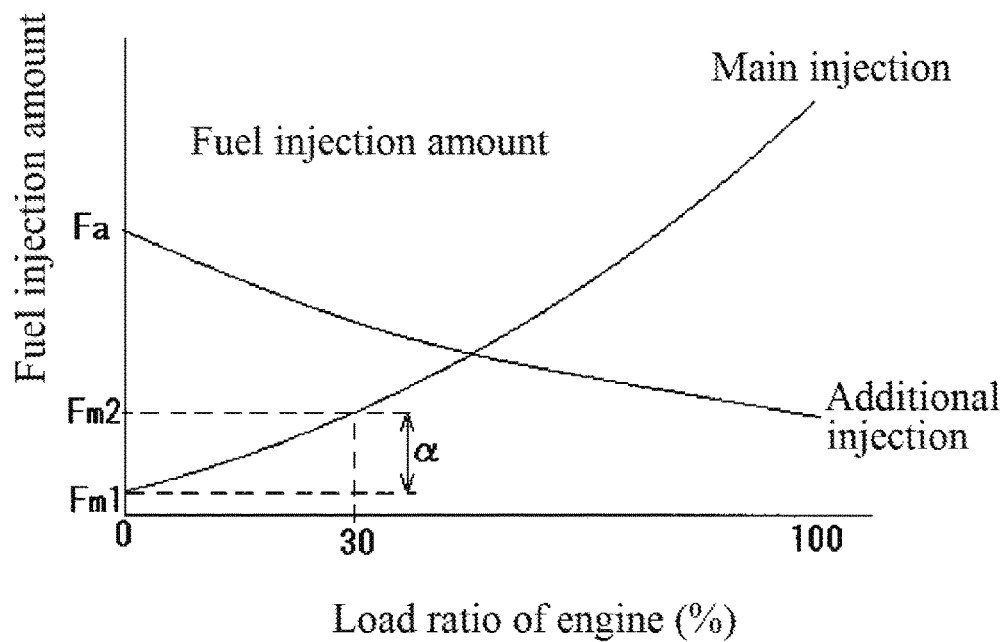
FIG. 5 is an explanatory diagram schematically illustrating relationships between a load ratio of an engine, and a main injection amount and an additional injection amount of fuel in order to supply a DFP with a predetermined heating amount when running at a predetermined rotational speed (regeneration rotational speed).

FIG. 5 is a schematic illustration of relationships between the load ratio of the engine, and the main injection amount and the additional injection amount of fuel, in order to supply the DPF with a certain heating amount needed for regeneration in a state in which the engine is maintained at the certain regeneration rotational speed.

Namely, when the load ratio on the engine has been increased, an increase is needed in the main injection amount of fuel in order to maintain the certain engine rotational speed.

On the other hand, if the main injection amount increases accompanying an increase in the load ratio of the engine and the heating amount increases accompanying burn of the main injection fuel, the heating amount needed for regeneration can still be supplied to the DPF even if the additional injection amount is decreased.

In setting of the fuel injection amount (the main injection and additional injection) in the forced regeneration of the present invention which is performed in a low load state with an inlet port 11 of a compressor body 10 closed and with the discharge side of the compressor body 10 is opened to the atmosphere, the heating amount needed can be obtained at an engine load ratio condition set to 0% by setting a main injection amount to Fm1 and an additional injection amount to Fa as in the example illustrated in FIG. 5.

In contrast thereto, in a conventional engine-driven compressor, even in a unloaded running state in which an inlet port 11 of a compressor body 10 is closed and air is not being compressed by the compressor body 10, the engine 20 still has a relatively high load of about 30% in a state in which a high pressure is maintained at the discharge side of the compressor body 10, because the compressor body 10 is run to resist pressurized air trying to flow back from the discharge side to the air intake side.

Thus in the conventional engine-driven compressor, in case a fixed-load type forced regeneration is implemented with the additional injection amount at Fa, an engine control unit (ECU) 80 that controls the running state of the engine performs main injection at the main injection amount corresponding to a load ratio of 30% (Fm2 in FIG. 5) to maintain a predetermined regeneration rotational speed also at a 30% loaded state, and therefore, the total injection amount of forced regeneration in the conventional engine-driven compressor which performs forced regeneration at a load ratio of 30% is increased by an amount of the increase in main injection (Fm2−Fm1=α) compared to the total fuel injection amount (main injection Fm1+additional injection Fa) of the present invention which performs forced regeneration at a load ratio of 0%.

As a result thereof, the DPF is excessively heated by the heating amount supplied to the DPF from burning the total amount of fuel supplied from the increased fuel main injection amount α and the certain amount of additional injection Fa, and the temperature of the DPE might exceed the permissible temperature of the DPF and might reach to the self burning temperature of the PM.

Thus the present invention adopts a configuration enabling the engine to run in a low load state during fixed-load type forced regeneration.

Configuration of Engine-Driven Compressor

Figure 1:
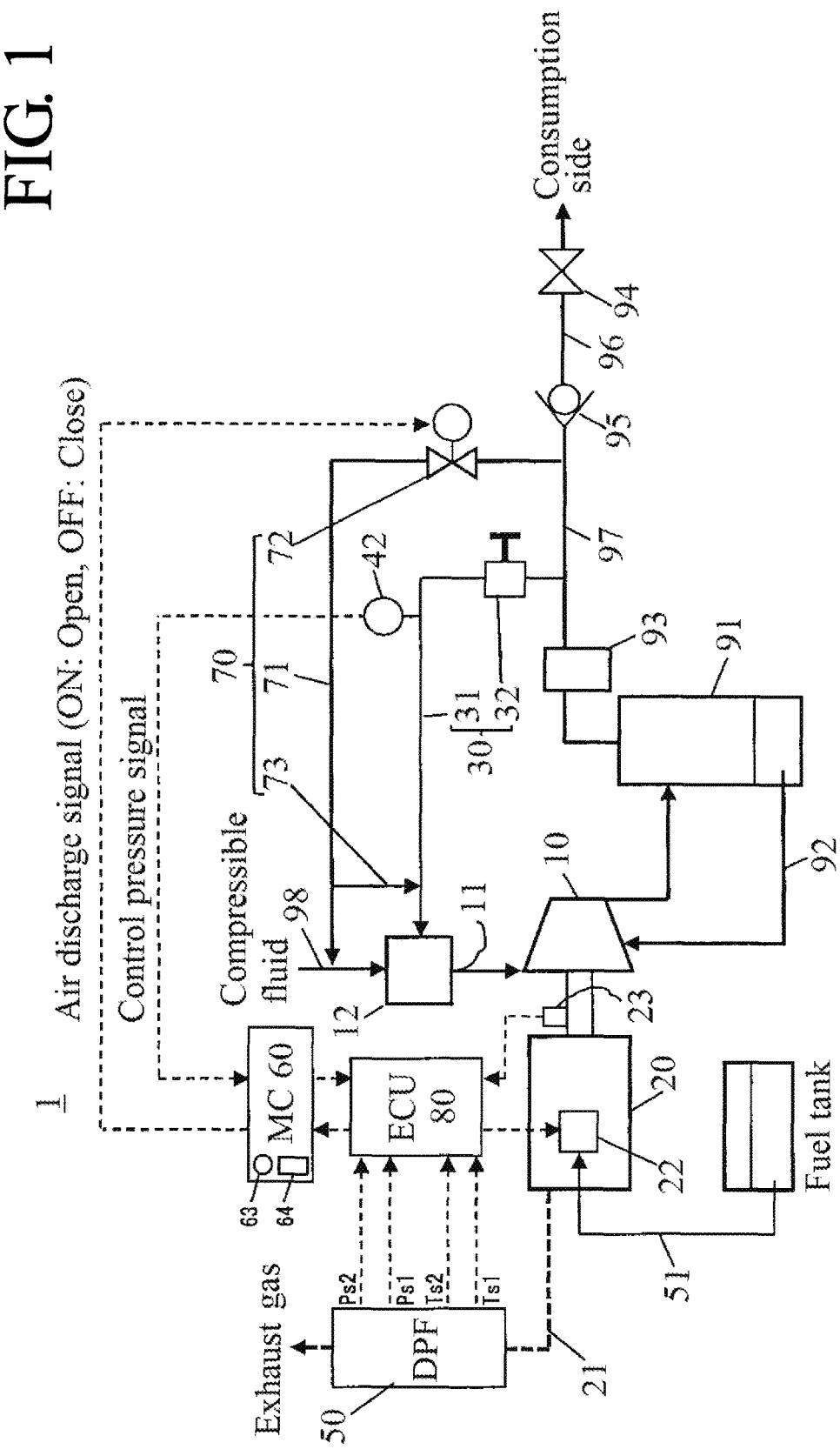
FIG. 1 is an explanatory diagram of an engine-driven compressor according to the present invention.

An example of a configuration of the engine-driven compressor 1 of the present invention is illustrated in FIG. 1.

The engine-driven compressor 1 includes a compressor body 10 that takes in air and compresses then discharges air, and an engine (diesel engine) 20 for driving the compressor body 10.

In this embodiment, the above-mentioned compressor body 10 employs an oil cooled screw compressor for oil-cooling, compressing and discharging the air taken in together with cooling oil. Configuration is such that a receiver tank 91 is in communication with the compressor body 10 on the discharge side, primary separation of compressed air and cooling oil is performed inside the receiver tank 91, and the cooling oil separated in the receiver tank 91 is introduced into the oil supply port of the compressor body 10 through an oil circuit 92 so as to enable circulated usage.

Configuration is such that the compressed air which has been subjected to primary separation of oil components in the receiver tank 91 is passed through a separator 93 where oil still remaining in the compressed air is separated and removed, and then introduced through a service valve 94 to pneumatic equipment (not illustrated in the drawings) connected to the consumption side.

A check valve 95 is provided partway along a passage reaching from the receiver tank 91 to the consumption side thereof, and fluid on the side of a consumption passage 96 reaching from the check valve 95 to the consumption side thereof is prevented from flowing back to the side of a discharge passage 97 formed between the compressor body 10 and the check valve 95.

A capacity control unit 30 which performs open/close control on an inlet valve 12 according to changes in the discharge side pressure of the compressor body 10 (the pressure inside the discharge passage 97), is provided between the discharge passage 97 and the inlet valve 12. In the illustrated embodiment, the capacity control unit 30 is configured by a control passage 31 having one end in communication with the discharge passage 97 and another end in communication with a valve closure pressure receiving chamber of the inlet valve 12, and a pressure regulation valve 32 that opens or closes the control passage 31 according to the pressure inside the discharge passage 97.

In the illustrated embodiment, a configuration is illustrated in which the other end of the control passage 31 is in communication with the valve closure pressure receiving chamber provided to the inlet valve 12. However, the "valve closure pressure receiving chamber of an inlet valve 12" of the present invention also encompasses an operation pressure chamber of an open/close mechanism in cases in which the inlet valve 12 is provided with a valve body open/close mechanism such as a separate regulator.

A low load operating apparatus 70 is also provided between the above-mentioned discharge passage 97 and an inlet passage 98 provided on the primary side of the inlet valve 12 to realize a low load state of the compressor body 10 when implementing forced regeneration processing described below by inactivating the capacity control unit 30, closing the inlet valve 12 provided to the inlet port 11 of the compressor body 10, and opening the discharge side of the compressor body 10 (the discharge passage 97) to the atmosphere.

In the illustrated embodiment, the low load operating apparatus 70 is configured by an air discharge passage 71 having one end in communication with the discharge passage 97 and another end in communication with the inlet passage 98; an air discharge valve 72 that is a solenoid open/close valve for opening or closing the air discharge passage 71 according to a control signal from a main controller (MC) 60 that will be described below; and a closed-valve hold circuit 73 that communicates the air discharge passage 71 on the secondary side of the air discharge valve 72 with the valve closure pressure receiving chamber of the inlet valve 12.

An aftertreatment apparatus for exhaust gas (DPF) 50 is provided on the exhaust path (exhaust pipe) 21 of the above-mentioned engine 20 in order to remove PM contained in the exhaust gas.

The DPF 50 is a filter element housed in a DPF body which is a container configured so as to enable the introduction of exhaust gas from the engine 20. Accordingly, the PM is collected by the filter element and deposited on or in the filter element when exhaust gas passes through this filter element, thereby enabling the PM contained in the exhaust gas to be removed.

A continuous regeneration type of configuration for the DPF 50 is adopted in the engine-driven compressor 1 of the present invention with combined use of an oxidation catalyst as described in the related art. The oxidation catalyst is housed in the DPF body at the upstream side of the filter element such that the PM collected by the filter element and deposited on the same is burned by increasing the temperature inside the DPF to the activation temperature of the oxidation catalyst or above.

The DPF 50 comprises temperature detector (Ts1, Ts2) to detect the temperature of the oxidation catalyst, and pressure detection units (Ps1, Ps2) to detect the pressures in the DPF before and after passing the filter element. Thus the temperature of the oxidation catalyst and the deposition amount of the PM with respect to the filter element can be monitored based on the detection signals from the detector.

It should be noted that the reference numeral 60 in FIG. 1 indicates the main controller (MC) of the engine-driven compressor 1, and the reference numeral 80 indicates an engine control unit (ECU) 80 that controls the running state of the engine by using a fuel injection device 22 provided to the engine 20 to control the injection of fuel (the injection amount, injection timing, number of times of injection, and the like).

A clogging state display 63 and an input device 64 are provided to the MC 60, and the MC 60 is also equipped with a speed control unit 61 and a forced regeneration control unit 62 implemented by executing pre-stored programs.

The above-mentioned clogging state display 63 is an indicator light. The display 63 indicates by blinking that the deposition amount of PM on the filter element of the DPF has reached a predetermined amount for starting forced regeneration (for example 10 g/L) or greater, and, when a forced regeneration start command is input by the input device 64 described below, the clogging state display 63 indicates by lighting that forced regeneration is being executed.

The above-mentioned input device 64 is a switch for an operator to input a forced regeneration start command.

In the illustrated embodiment, the above-mentioned clogging state display and input device are provided to the MC 60, however, they may be provided at various positions easily seen and operated by an operator such as on an instrument panel or an operation panel provided to the engine-driven compressor 1.

Moreover, during normal running, the above-mentioned speed control unit 61 outputs to the ECU 80 a rotational speed signal according to changes in pressure at the discharge side of the compressor body 10 detected by control pressure detection unit 42, and the pressure inside the control passage 31 in the illustrated embodiment. The fuel injection device 22 is controlled according to the rotational speed signal by normal running control unit 81 of the ECU that will be described below. The speed control unit 61 configures the speed control unit 40 that controls the rotational speed of the engine 20 during normal running together with the control pressure detecting unit 42 and the normal running control unit 81 of the ECU 80.

Moreover, the above-mentioned forced regeneration control unit 62 outputs a switching signal on input of a forced regeneration start command from the input device 64. Output of the switching signal releases the air discharge valve 72 provided to the low load operating apparatus 70, deactivates the capacity control unit 30 and closes the inlet valve 12. The discharge side of the compressor body 10 is thereby also opened to the atmosphere, and low load operating of the compressor body 10 is implemented. On receipt of the switching signal from the forced regeneration control unit 62, the ECU 80 switches the running state of the engine 20 to a forced regeneration mode.

The normal running control unit 81, a deposition state determination unit 83, a stand-by running control unit 84, and a forced regeneration running control unit 82 are implemented in the above-mentioned ECU 80 by executing a pre-stored program.

From the above, the normal running control unit 81 controls the engine 20 during normal running of the engine-driven compressor 1, and therefore controls the fuel injection device 22 of the engine 20 according to a received rotational speed signal from the above-mentioned speed control unit 61 of the MC 60.

Moreover, the deposition state determination unit 83 determines the state of deposition of PM with respect to the filter element based on the detection signals of the pressure detection units (Ps1, Ps2) provided in the DPF 50.

Moreover, when the deposition state determination unit 83 has determined that the deposition amount of PM with respect to the filter element is a predetermined amount for starting forced regeneration (for example, 10 g/L) or greater, the stand-by running control unit 84 deactivates rotational speed control of the engine 20 by the speed control unit 40 including the above-mentioned normal running control unit 81, and maintains the rotational speed of the engine 20 at a predetermined unloaded running speed (1350 min$^{-1}$ in this embodiment), and stands by until a switching signal is received from the forced regeneration control unit 62 of the MC 60.

Moreover, the forced regeneration running control unit 82 ends running control of the engine 20 by the above-mentioned stand-by running control unit 84 on receipt of a switching signal from the forced regeneration control unit 62 of the MC 60, and transitions into a running state (a forced regeneration mode) in which the rotational speed of the engine 20 is a predetermined regeneration rotational speed, and additional injection of fuel is performed.

Control Operation of Engine-Driven Compressor

In the engine-driven compressor 1 of the present invention provided with the configuration explained above, the operation of each section is respectively controlled in the following manner during normal running and during forced regeneration processing.

During Normal Running

During normal running in which forced regeneration processing that will be described below is not being performed, in order to be able to supply compressed air at a certain pressure to the consumption side at low fuel consumption, the engine-driven compressor 1 performs capacity control to control opening or closing of the inlet port 11 of the compressor body 10 according to pressure at the discharge side of the compressor body 10 which varies according to the consumption of compressed air, and performs speed control so as to increase or decrease the rotational speed of the engine 20.

Capacity Control

In the embodiment illustrated in FIG. 1, the above-mentioned capacity control unit 30 is configured by the control passage 31 and the pressure regulation valve 32 provided to the control passage 31.

The pressure regulation valve 32 provided to the capacity control unit 30 opens or closes the control passage 31 according to the pressure inside the discharge passage 97 (pressure at the discharge side of the compressor body 10). Thus the pressure regulation valve 32 is fully closed when the pressure of the discharge passage 97 is at a pre-set standard pressure of the compressor (0.69 MPa in this embodiment) or below due to the consumption of compressed air on the consumption side. Therefore, without introducing operation pressure to the valve closure pressure receiving chamber of the inlet valve 12, the inlet valve 12 is fully opened due to the return force of a spring provided to the valve closure pressure receiving chamber in a state in which air intake and discharge of compressed air is performed by the compressor body 10.

When the consumption of compressed air on the consumption side decreases or stops and the pressure inside the discharge passage 97 rises to the above-mentioned standard pressure or higher, the pressure regulation valve 32 starts to open, the open surface area of the valve seat of the pressure regulation valve 32 increases according to the pressure rise in the discharge passage 97, and the control pressure inside the control passage 31 rises in proportion thereto. Due to the introduction of the control pressure into the valve closure pressure receiving chamber of the inlet valve 12, the inlet valve 12 overcomes the return force of the spring and starts to close as the control pressure rises and the air intake amount of the compressor body 10 decreases.

When the pressure inside the discharge passage 97 then reaches or exceeds the unloaded running start pressure which is a predetermined pressure higher than the standard pressure (0.80 MPa in this embodiment), the pressure inside the control passage 31 rises, the inlet valve 12 fully closes, and the compressor body 10 transitions into unloaded running.

Speed Control

Figure 2:
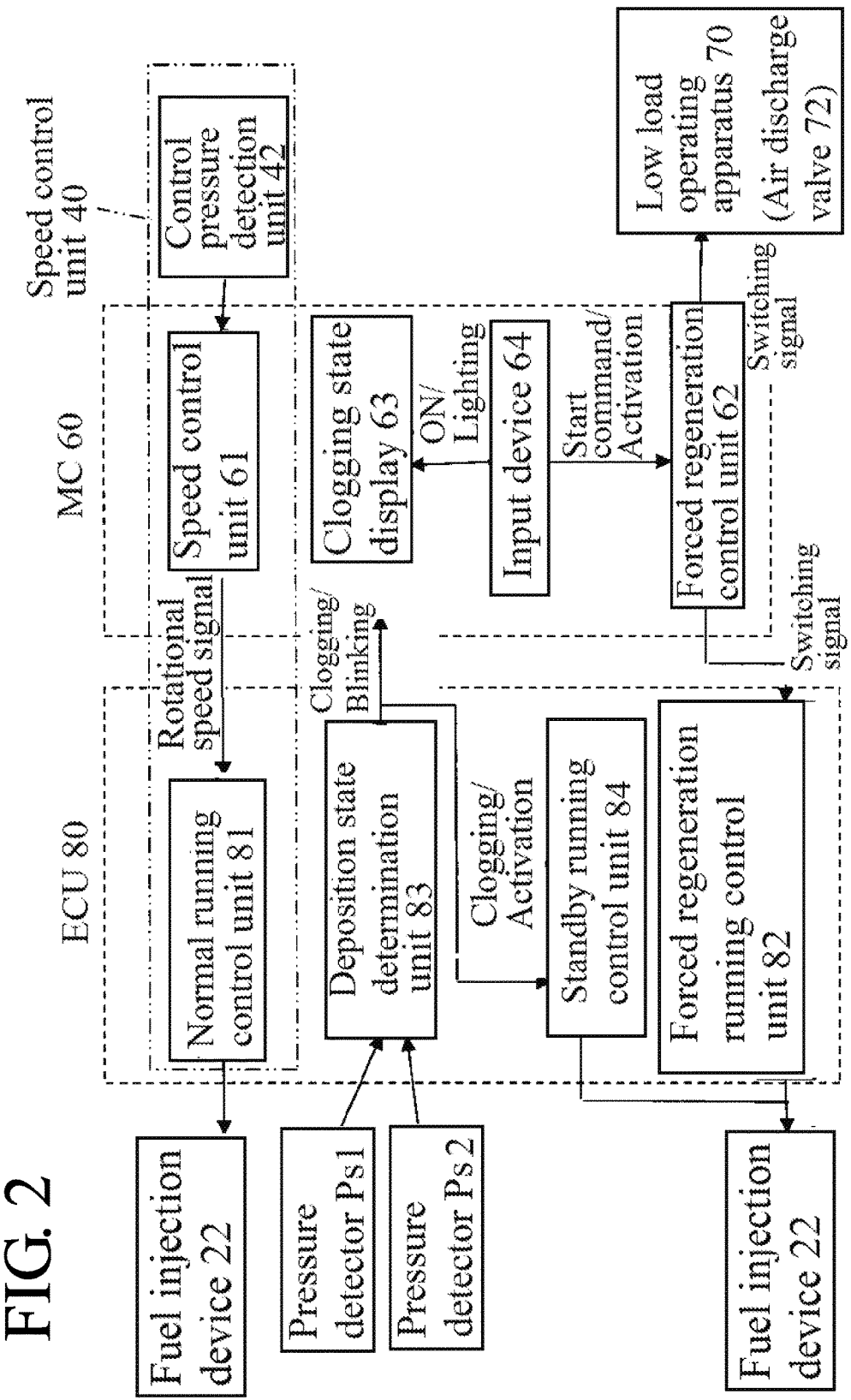
FIG. 2 is a functional block diagram of a microcontroller (MC) and an engine control unit (ECU)

The speed control unit 40 controls the engine rotational speed during normal running. In the illustrated embodiment, the speed control unit 40 is implemented by the control pressure detector 42 that detects the pressure inside the control passage 31, the speed control unit 61 of the MC 60, and the normal running control unit 81 of the ECU 80 as illustrated in FIG. 2.

The control pressure which is the pressure inside the control passage 31 is 0 MPa when the pressure regulation valve 32 is closed. The pressure regulation valve 32 then opens as the pressure inside the discharge passage 97 rises, and the control pressure rises as the degree of opening of the pressure regulation valve 32 increases.

The control pressure detector 42 detects the pressure inside the control passage 31 as it changes in this manner and outputs control pressure signal to the speed control unit 61 of the MC 60.

On receipt of the control pressure signal from the control pressure detector 42, based on a pre-stored correlation map between control pressure signal and engine rotational speed, the speed control unit 61 of the MC 60 outputs the engine rotational speed signal corresponding to the received control pressure signal to the normal running control unit 81 of the ECU 80.

On receipt of the rotational speed signal from the speed control unit 61 of the MC 60, the normal running control unit 81 of the ECU 80 outputs a control signal to the fuel injection device 22 of the engine 20 corresponding to the received rotational speed signal, and the fuel injection device 22 increases or decreases the fuel injection (jetting) amount according to the received control signal from the normal running control unit 81 so as to control the output and rotational speed of the engine.

In the speed control by the speed control unit 40 configured as described above, the engine 20 is run at a full-load rotational speed (3000 min$^{-1}$ in this embodiment) when the pressure regulation valve 32 is closed and the control pressure is 0 MPa. When the pressure regulation valve 32 is opened, the rotational speed of the engine 20 is gradually decreased in inverse proportion to the rise in control pressure as the degree of opening increases, and when the pressure inside the discharge passage 97 reaches the unloaded running start pressure or higher and the control pressure reaches the maximum pressure, the engine 20 is run at a unloaded rotational speed (1350 min$^{-1}$ in this embodiment).

Transition from Normal Running into Stand-by Running

The method for regenerating the DPF of the present invention is executed under the condition that an operator has input a forced regeneration start command through the input device 64. In order to enable an operator to input such a forced regeneration start command at an appropriate time, the deposition state determination unit 83 and the clogging state display 63 are provided in the engine-driven compressor 1 of this embodiment, thereby enabling indication that a predetermined clogged state has occurred when the deposition amount of the PM on the filter element has exceeded a predetermined amount.

Moreover, the stand-by running control unit 84 is provided to lower the rotational speed of the engine 20 to the predetermined unloaded running speed and stand-by for the interval until a forced regeneration start command is input when the predetermined clogged state has occurred. Thereby the exhaust gas temperature is prevented from rising as the engine 20 transitions into running under high load or the like, and damage such as damage to the filter element due to suddenly burning of the deposited PM is prevented.

In order to enable the deposition state of PM deposited on the filter element to be determined by the deposition state determination unit 83 of the ECU 80, signal lines are connected between the pressure detection units (Ps1, Ps2) provided in the DPF 50 and the ECU 80, and pressure detection signals from the pressure detection units (Ps1, Ps2) are input to the ECU 80.

The deposition state determination unit 83 of the ECU 80 computes an estimated value of the deposition amount of PM with respect to the filter element (the PM deposition amount (g) per filter element volume (1 liter)) based on the received pressure detection signals and based on an equation entered in advance, and compares the computed estimated value against pre-set reference values.

The reference values include a pre-set deposition amount as the deposition amount to start forced regeneration (amount for starting forced regeneration: 10 g/L in this embodiment), and when deposition state determination unit 83 determines that the deposition amount of PM with respect to the filter element is this amount for starting forced regeneration or greater, the deposition state determination unit 83 outputs a predetermined clogging detection signal to the MC 60, and starts up the stand-by running control unit 84.

Due to starting up the stand-by running control unit 84, the ECU 80 ends speed control based on the engine rotational speed signal from the MC 60 (control by the normal running control means). Then, according to a pre-recorded stand-by running control program, the running state of the engine 20 transitions into a stand-by running mode which is a predetermined unloaded rotational speed (1350 min$^{-1}$ in this embodiment) for standing by in this running state until a forced regeneration start command is input through the input device 64 that will be described below.

On receipt of a clogging signal from the ECU 80, the MC 60 blinks the clogging state display 63 so as to indicate that the deposition amount of PM with respect to the filter element has reached the amount to perform forced regeneration.

Transition from Stand-by Running into Forced Regeneration

In the above-mentioned stand-by state with the clogging state display 63 blinking, an operator executes forced regeneration of the DPF by inputting a regeneration processing start command through the input device 64 (in this embodiment, in order to prevent inadvertent operation, a switch which is the input device 64 is pressed for three seconds or longer).

It should be noted that, when the operator has become aware that the clogging state display 63 is in a blinking state, the operator preferably fully closes the service valve 94 supplying compressed air to the consumption side and checks that there is sufficient remaining fuel to continue the regeneration processing prior to inputting the regeneration processing start command.

When the forced regeneration start command has been input by the operator through the input device 64, as will be described below, the capacity control unit 30 is deactivated and the load of the compressor body 10 is reduced, and the running state of the engine 20 is switched from the stand-by mode mentioned above to the forced regeneration mode.

It should be noted that, in addition to the following processing, when the forced regeneration start command is input by the input device 64, the MC 60 may also switch the indication of the clogging state display 63 from a "blinking" state to a "lighted" state so as to be able to indicate that the forced regeneration processing is in progress.

Deactivation of the Capacity Control Means and Low Load Operating of the Compressor Body When the forced regeneration start command is input by the input device 64, the forced regeneration control unit 62 of the MC 60 outputs a switching signal (open valve signal) to the air discharge valve 72 provided to the low load operating apparatus 70, and opens the air discharge valve 72.

As mentioned above, the low load operating apparatus 70 is configured by the air discharge passage 71 having one end in communication with the discharge passage 97 and the other end in communication with the inlet passage 98 provided on the primary side of the inlet valve 12, by the air discharge valve 72 that is a solenoid valve for opening or closing the air discharge passage 71; and a closed-valve hold circuit 73 that communicates the air discharge passage 71 on the secondary side of the air discharge valve 72 with the valve closure pressure receiving chamber of the inlet valve 12 (in the example illustrated, in communication through the control passage 31 with the secondary side of the pressure regulation valve 32).

Moreover, configuration is such that the pressure inside the discharge passage 97 can be maintained at a predetermined lower-limit pressure (0.25 MPa in this embodiment) needed to supply lubrication oil inside the receiver tank 91 to the compressor body by opening the air discharge valve 72 while the compressor body 10 is running, and the fully closed pressure of the above-mentioned inlet valve 12 is set at just slightly higher than the above-mentioned lower-limit pressure.

Thus when the air discharge valve 72 provided to the low load operating apparatus 70 configured as described above is opened, the pressure inside the discharge passage 97 is discharged (purged) through the air discharge passage 71 and the inlet passage 98, and part of the compressed air introduced into the air discharge passage 71 is introduced to the valve closure pressure receiving chamber of the inlet valve 12 through the closed-valve hold circuit 73.

Thereby, irrespective of the operational state being implemented in the capacity control unit 30, the inlet valve 12 closes the inlet port 11, and the discharge side of the compressor body 10 adopts a low load state opened to the atmosphere.

In this manner, when the capacity control unit 30 is deactivated and the inlet valve 12 is closed by opening the air discharge valve 72, a low load state is achieved in which the discharge side of the compressor body 10 is opened to the atmosphere and the power needed to drive the compressor body 10 is reduced.

It should be noted that, as the discharge of compressed air inside the discharge passage 97 progresses and the pressure inside the discharge passage 97 drops, the pressure of compressed air introduced into the valve closure pressure receiving chamber of the inlet valve 12 through the air discharge passage 71 and the closed-valve hold circuit 73 also drops. However, due to setting the fully closed pressure of the inlet valve 12 to a slightly higher pressure than the above-mentioned lower-limit pressure, the operational pressure introduced to the valve closure pressure receiving chamber of the inlet valve 12 reaches a pressure slightly lower than the fully closed pressure of the inlet valve when the pressure inside the discharge passage 97 reaches the above-mentioned lower-limit pressure, thereby the inlet valve 12 opens slightly and the compressor body 10 starts air intake.

As a result, the compressor body 10 discharges a small amount of compressed air, the pressure inside the discharge passage 97 rises, and the operational pressure introduced to the valve closure pressure receiving chamber of the inlet valve 12 rises, the inlet valve 12 closes. The pressure inside the discharge passage 97 is maintained at substantially the lower-limit pressure by repeatedly performing such an operation, and the inlet valve 12 provided to the inlet port 11 of the compressor body 10 maintains a substantially closed state.

The load on the compressor body 10 is accordingly reduced during forced regeneration of the DPF 50, and a stable state is also maintained.

Switching of Engine Running Mode

When the operator inputs a regeneration processing start command through the input device 64, the forced regeneration control unit 62 of the MC 60 outputs a switching signal, and the switching signal is input to the ECU 80.

On receipt of the switching signal, the ECU 80 starts up the forced regeneration running control unit 82, and the running state of the engine 20 is switched from stand-by mode running under the stand-by running control unit 84 to forced regeneration mode running under the forced regeneration running control unit 82.

The rotational speed of the engine running at the unloaded rotational speed is thereby increased to a predetermined regeneration rotational speed (2200 min$^{-1}$ in this embodiment), and processing is started to increase the temperature of the exhaust gas, and to start additional injection of fuel in this embodiment.

It should be noted that the ECU 80 may be configured so as to perform self-diagnostics as to whether or not conditions for starting forced regeneration have been met by the various sensors provided at respective locations on the engine 20 (for example, a cooling water temperature of 60° C. or above) after receiving the switching signal from the forced regeneration control unit 62 of the MC 60 and prior to switching the engine running mode.

In such cases, the above-mentioned transition into running in the forced regeneration mode under the forced regeneration running control unit 82 may be employed as a condition to end self-diagnostics, or, during self-diagnostics, a continuation of running in stand-by mode (running at the unloaded rotational speed) under the stand-by running control unit 84 may be employed therefor.

Figure 3:
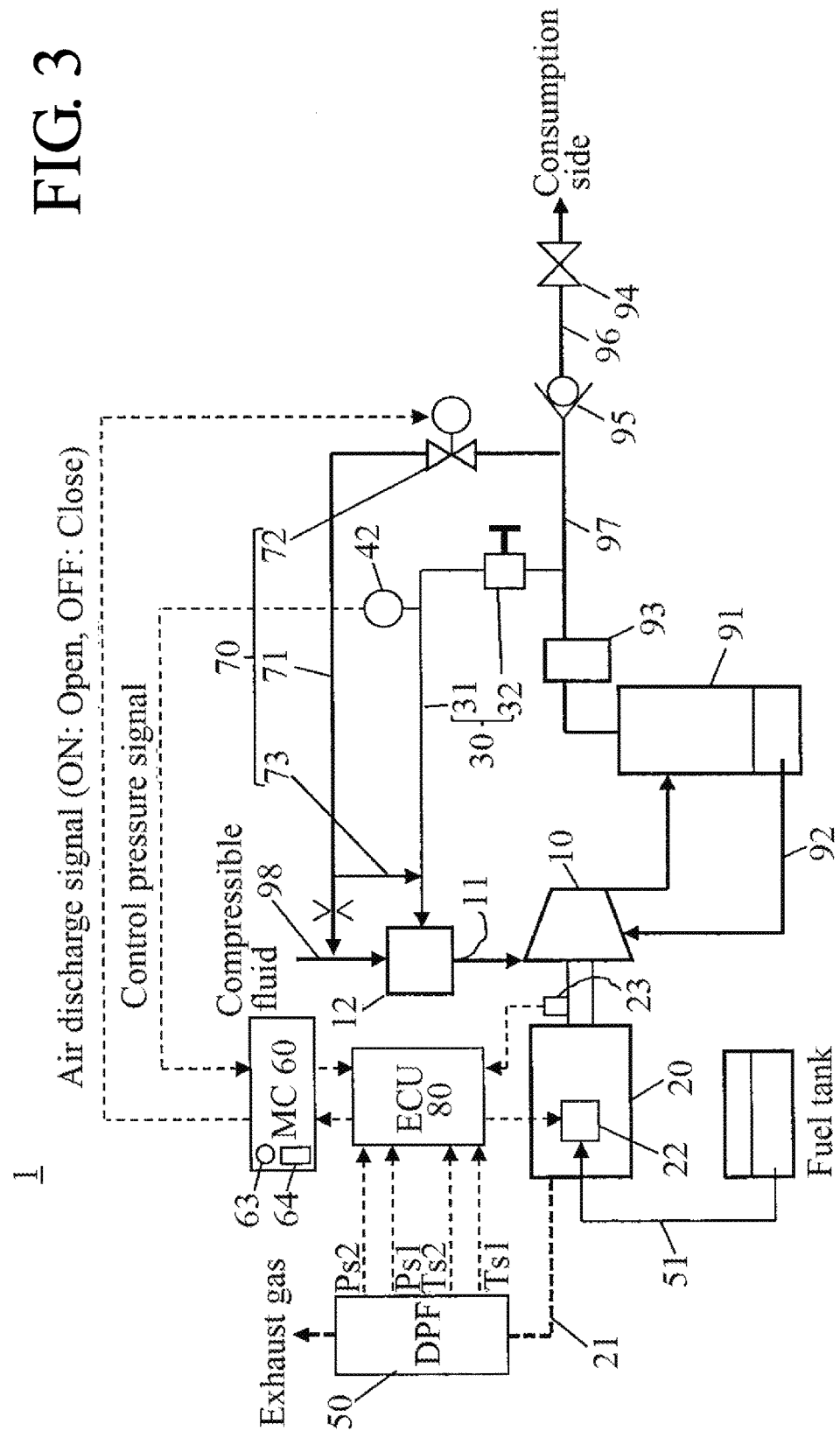
FIG. 3 is an explanatory diagram of another engine-driven compressor according to the present invention.

In cases in which such self-diagnostics is performed, by providing a constriction on the air discharge passage 71 at the secondary side of the air discharge valve 72 as illustrated in FIG. 3, or by selecting the diameter of the air discharge passage 71, the time from opening the air discharge valve 72 until the pressure inside the discharge passage 97 drops to the above-mentioned lower-limit pressure is set to be substantially the same as the time until completion of the above-mentioned self-diagnostics, and is preferably set slightly shorter than the time until completion of the self-diagnostics.

In this embodiment, due to setting the fully closed pressure of the inlet valve 12 slightly higher than the lower-limit pressure as mentioned above, maintaining the above-mentioned lower-limit pressure is realized by balancing the amount of compressed air discharged (purged) by opening the air discharge valve 72 and the amount of compressed air discharged by the compressor body 10. Thus, if the amount of compressed air discharged through the air discharge passage 71 increases, then the amount of compressed air discharged from the compressor body 10 also increases, and the load on the compressor body 10 during forced regeneration increases.

However, if the amount of compressed air discharged through the air discharge passage 71 decreases, then the amount of compressed air for the compressor body 10 to discharge also decreases, and so the load on the compressor body during forced regeneration can be decreased. However, if the discharge amount is too much constricted, then this lengthens the time from opening the air discharge valve 72 until the pressure at the discharge side of the compressor body 10 drops to the lower-limit pressure, and due to switching to the forced regeneration mode in which the engine 20 runs in a state of comparatively high load prior to the pressure on the discharge side of the compressor body 10 dropping, the exhaust temperature might rise excessively, and there might be damage to the filter element or the like.

Setting the discharge amount of the compressed air discharged through the air discharge passage 71 as mentioned above thereby enables minimization of the increase in speed to the forced regeneration rotational speed, and of the power needed to drive the compressor body in regeneration processing while achieving a drop in pressure at the discharge side of the compressor body to the lower-limit pressure before starting post injection, enabling forced regeneration processing to be performed with the lowest possible fuel consumption.

Moreover, in order to increase the speed to the forced regeneration rotational speed, and to accurately start post injection after the pressure inside the discharge passage 97 has dropped to the lower-limit pressure, the pressure inside the discharge passage 97 may be detected, and the condition to start control of the engine by the forced regeneration running control unit 82 may be that the detected pressure has reached the above-mentioned lower-limit pressure.

Figure 4:
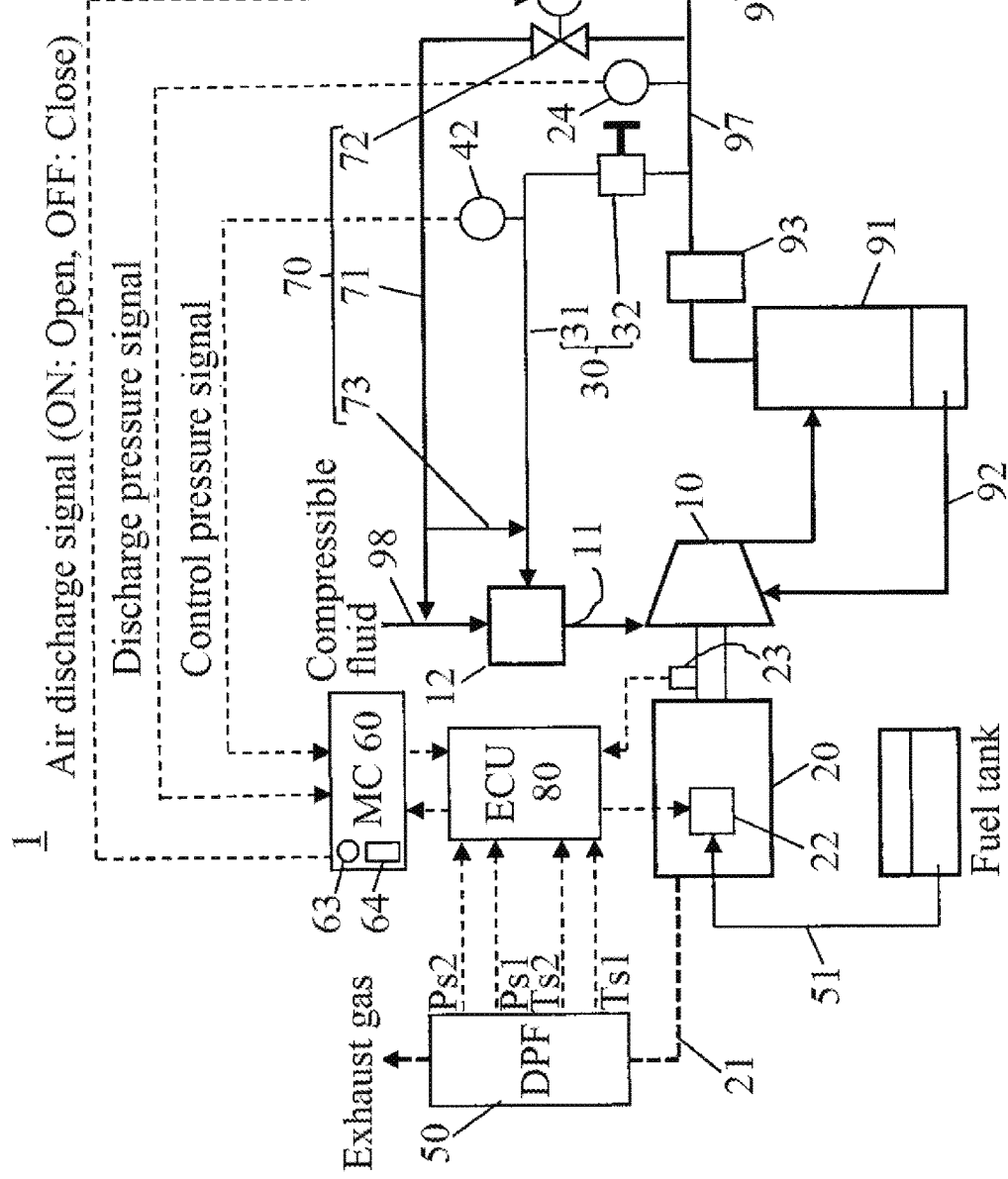
FIG. 4 is an explanatory diagram of still another engine-driven compressor according to the present invention.

In such cases, a discharge pressure detector 24 may be separately provided to detect the pressure inside the discharge passage 97 as illustrated in FIG. 4, and a running mode switching signal may be output by the forced regeneration control unit 62 by inputting a detection signal of the discharging pressure detector 24 to the MC.

Restoration Processing to Normal Running

The forced regeneration processing explained above is performed until elapse of a predetermined time, and until the PM deposited on the filter element has decreased to less than a predetermined end amount of forced regeneration.

In this embodiment, counting is started by a timer (not illustrated in the drawings) when a forced regeneration start command is input through the input device 64, and the forced regeneration processing time is counted.

Moreover, the deposition state determination unit 83 computes the deposition amount of the PM with respect to the filter element based on the detection signal from the pressure detection unit (Ps1, Ps2) provided to the DPF 50, and determines whether or not the deposition amount of the PM has dropped to less than the predetermined end amount of forced regeneration (8 g/L in this embodiment) from among pre-stored reference values.

Then, when the timer has counted the elapse of a predetermined time (for example, 30 minutes) and the deposition state determination unit 83 has determined that the deposition amount of the PM with respect to the filter element has dropped to less than the above-mentioned end amount of forced regeneration (8 g/L in this embodiment), output of the open valve signal being output to the air discharge valve 72 by the forced regeneration control unit 62 of the MC 60 is stopped and the air discharge valve 72 is closed, thereby the capacity control unit 30 is activated and capacity control is restarted.

Moreover, the forced regeneration control unit 62 of the MC 60 outputs a switching signal to the ECU 80 for switching from running the engine 20 in the forced regeneration mode to the normal running mode. The ECU 80 ends running of the engine 20 in the forced regeneration mode under the forced regeneration running control unit 82, and restores running control of the engine 20 under the normal running control unit 81, namely, rotational speed control of the engine 20 by the speed control unit 40.

The MC 60 also restores normal running by turning the clogging state display 63 OFF, returning the switch which is the input device 64 to the OFF state, and ending forced regeneration.

DESCRIPTIONS OF REFERENCE NUMERALS

1 Engine-driven compressor
10 Compressor body
11 Inlet port
12 Inlet valve
20 Engine
21 Inlet valve
21 Exhaust path (exhaust pipe)
22 Fuel injection device
23 Rotational speed detection unit
24 Discharge pressure detector
30 Capacity control unit
31 Control passage
32 Pressure regulation valve
40 Speed control unit
42 Control pressure detection unit
50 Aftertreatment apparatus for exhaust gas (DPF)
60 Main controller (MC)
61 Speed control unit
62 Forced regeneration control unit
63 Clogging state display
64 Input device
70 Low load operating apparatus
71 Air discharge passage
72 Air discharge valve
73 Closed-valve hold circuit
80 Engine control unit (ECU)
81 Normal running control unit
82 Forced regeneration running control unit
83 Deposition state determination unit
84 Stand-by running control unit
91 Receiver tank
92 Oil circuit
93 Separator
94 Service valve
95 Check valve
96 Consumption passage
97 Discharge passage
98 Inlet passage
Ts1, Ts2 Temperature detector
Ps1, Ps2 Pressure detector

The invention claimed is:

1. A method for regenerating an aftertreatment apparatus for exhaust gas in an engine-driven compressor,
the engine-driven compressor comprising a compressor body that takes in and compresses a compressible fluid, an engine that drives the compressor body,
a capacity control unit that includes an inlet valve for opening or closing an inlet port of the compressor body and that performs capacity control by opening or closing the inlet valve according to changes in pressure on a discharge side of the compressor body, and
a speed control unit for performing rotational speed control of the engine, the method comprising:
providing the aftertreatment apparatus for exhaust gas on an exhaust path of the engine,
the aftertreatment apparatus for exhaust gas including a filter element for collecting particulate matter in exhaust gas and an oxidation catalyst;
when a deposition amount of the particulate matter on and/or in the filter element provided in the aftertreatment apparatus for exhaust gas reaches a predetermined amount or greater for starting a forced regeneration, and a forced regeneration start command has been input,
deactivating capacity control by the capacity control unit, closing the inlet valve, and opening the discharge side of the compressor body to the atmosphere, so as to place the compressor body in a low load state; and,
switching the engine to running in a forced regeneration mode in which the engine has a predetermined regeneration rotational speed and is placed in a predetermined running state to raise the temperature of exhaust gas, so as to perform forced regeneration processing by increasing the temperature inside the aftertreatment apparatus for exhaust gas to a temperature that is an activation temperature of the oxidation catalyst or above and is a temperature below the self burning temperature of the particulate matter, and forcefully burning the particulate matter deposited on the filter element of the aftertreatment apparatus for exhaust gas.

2. The method for regenerating an aftertreatment apparatus for exhaust gas in an engine-driven compressor according to claim 1, comprising:
providing pre-processing to deactivate rotational speed control by the speed control unit, to transition the engine into a stand-by running mode running at a predetermined unloaded rotational speed, and to stand-by for input of the forced regeneration start command, when the deposition amount of the particulate matter on and/or in the filter element provided in the aftertreatment apparatus for exhaust gas reaches the predetermined amount for starting forced regeneration or greater; and
performing the forced regeneration processing when the forced regeneration start command has been input during running in the stand-by running mode by deactivating the capacity control,
placing the compressor body in the low load state, and switching the running state of the engine from the stand-by running mode to the forced regeneration mode.

3. The method for regenerating an aftertreatment apparatus for exhaust gas in an engine-driven compressor according to claim 1, wherein
the forced regeneration processing is performed continuously until a predetermined time has elapsed and the deposition amount of the particulate matter on and/or in the filter element is less than a predetermined end amount of forced regeneration.

4. The method for regenerating an aftertreatment apparatus for exhaust gas in an engine-driven compressor according to claim 1, wherein
running control of the engine in the forced regeneration mode is accompanied by additional injection of fuel.

5. The method for regenerating an aftertreatment apparatus for exhaust gas in an engine-driven compressor according to claim 1, wherein
switching of the running state of the engine to the forced regeneration mode is performed after the compressor body has been placed in the low load state.

6. The method for regenerating an aftertreatment apparatus for exhaust gas in an engine-driven compressor according to claim 5, wherein
switching of the running state of the engine to the forced regeneration mode is performed after pressure on the discharge side of the compressor body has dropped to a predetermined lower-limit pressure or lower.

7. The method for regenerating an aftertreatment apparatus for exhaust gas in an engine-driven compressor according to claim 2, wherein
the forced regeneration processing is performed continuously until a predetermined time has elapsed and the deposition amount of the particulate matter on and/or in the filter element is less than a predetermined end amount of forced regeneration.

8. The method for regenerating an aftertreatment apparatus for exhaust gas in an engine-driven compressor according to claim 2, wherein
running control of the engine in the forced regeneration mode is accompanied by additional injection of fuel.

9. The method for regenerating an aftertreatment apparatus for exhaust gas in an engine-driven compressor according to claim 2, wherein
switching of the running state of the engine to the forced regeneration mode is performed after the compressor body has been placed in the low load state.

10. The method for regenerating an aftertreatment apparatus for exhaust gas in an engine-driven compressor according to claim 9, wherein
switching of the running state of the engine to the forced regeneration mode is performed after pressure on the discharge side of the compressor body has dropped to a predetermined lower-limit pressure or lower.

11. An engine-driven compressor comprising a compressor body that takes in and compresses a compressible fluid, an engine that drives the compressor body, capacity control unit that includes an inlet valve for opening or closing an inlet port of the compressor body and that performs capacity control by opening or closing the inlet valve according to changes in pressure on a discharge side of the compressor body, and speed control unit for performing rotational speed control of the engine, wherein the engine-driven compressor comprises:
an aftertreatment apparatus for exhaust gas that is provided on an exhaust path of the engine and that collects particulate matter in exhaust gas;
an input device for inputting a start command for forced regeneration processing in the aftertreatment apparatus for exhaust gas;
a forced regeneration control unit that outputs a switching signal on input of the start command by the input device;
a low load operating apparatus for placing the compressor body in a low load state by receiving the switching signal from the forced regeneration control unit, deactivating the capacity control by the capacity control unit, closing the inlet valve, and opening the discharge side of the compressor body to the atmosphere; and
a forced regeneration running controller for receiving the switching signal from the forced regeneration control unit, and transitions the engine into running in a forced regeneration mode in which the engine is run at a predetermined regeneration rotational speed and placed in a predetermined running state to raise the temperature of exhaust gas.

12. The engine-driven compressor according to claim 11, further comprising:
a pressure detector for detecting the pressure inside the aftertreatment apparatus for exhaust gas before and after passing a filter element;
a deposition state determination unit for receiving detection signals from the pressure detector, computing a deposition amount of the particulate matter with respect to the filter element, and comparing the computed deposition amount of the particulate matter against a pre-set reference value to determine a deposition state of the particulate matter with respect to the filter element; and
a stand-by running controller for, when the deposition state determination unit has determined that the particulate matter is deposited at or more than a predetermined amount for starting forced regeneration pre-set as a deposition amount at which forced regeneration is to be performed, deactivating the rotational speed control by the speed control unit, transitioning the engine into a stand-by running mode of running at a predetermined unloaded running speed, and standing by for input of a start command by the input device.

13. The engine-driven compressor according to claim 12, further comprising clogging state display for indicating the filter element is in a clogged state when the deposition state determination unit has determined that the particulate matter is deposited at the amount for starting forced regeneration or greater.

14. The engine-driven compressor according to claim 12, further comprising:
a timer that counts an elapsed time since input of a start command by the input device, wherein
when the timer has counted the predetermined time, and the deposition state determination unit has determined that the amount of particulate matter deposited on and/or in the filter element is less than a predetermined end amount of forced regeneration:
the forced regeneration control unit ends control of the inlet valve and opening of the discharge side of the compressor body to the atmosphere by the low load operating apparatus, and activates capacity control by the capacity control unit; and
the forced regeneration running control unit ends running of the engine in the forced regeneration mode and restores speed control by the speed control unit.

15. The engine-driven compressor according to claim 11, wherein the forced regeneration running control unit performs additional injection of fuel in the forced regeneration mode.

16. The engine-driven compressor according to claim 11, wherein the forced regeneration running controller transitions the engine into running in the forced regeneration mode after the compressor body has been placed in the low load state by the low load operating apparatus.

17. The engine-driven compressor according to claim 16, further comprising:
a discharge pressure detector for detecting the pressure on the discharge side of the compressor body, wherein
the forced regeneration running controller transitions the running state of the engine into the forced regeneration mode when the pressure from the discharge pressure detector on the discharge side of the compressor body reaches a predetermined lower-limit pressure.

18. The engine-driven compressor according to claim 13, further comprising:
a timer that counts an elapsed time since input of a start command by the input device, wherein
when the timer has counted the predetermined time, and the deposition state determination unit has determined that the amount of particulate matter deposited on and/or in the filter element is less than a predetermined end amount of forced regeneration:
the forced regeneration control unit ends control of the inlet valve and opening of the discharge side of the compressor body to the atmosphere by the low load operating apparatus, and activates capacity control by the capacity control unit; and the forced regeneration running control unit ends running of the engine in the forced regeneration mode and restores speed control by the speed control unit.

19. The engine-driven compressor according to claim 14, wherein the forced regeneration running control unit performs additional injection of fuel in the forced regeneration mode.

20. The engine-driven compressor according to claim 13, wherein the forced regeneration running controller transitions the engine into running in the forced regeneration mode after the compressor body has been placed in the low load state by the low load operating apparatus.

* * * * *